United States Patent [19]

Marks et al.

[11] Patent Number: 4,935,292

[45] Date of Patent: Jun. 19, 1990

[54] FUNCTIONALIZED POLYMERS FOR NONLINEAR OPTICAL APPLICATION

[75] Inventors: Tobin J. Marks, Evanston, Ill.; Cheng Ye, Beijing, China

[73] Assignee: Northwestern University, Evanston, Ill.

[21] Appl. No.: 168,146

[22] Filed: Mar. 15, 1988

[51] Int. Cl.$^5$ .......................... H01S 3/08; H01S 3/10; H01S 3/16
[52] U.S. Cl. .................................. 428/220; 252/582; 428/333; 525/333.6; 525/333.3
[58] Field of Search ................. 525/333.6; 428/1, 220; 252/582, 583

[56] References Cited

U.S. PATENT DOCUMENTS

| | | | |
|---|---|---|---|
| 4,624,872 | 11/1986 | Stuetz | 428/1 |
| 4,640,800 | 2/1987 | Choe et al. | 260/396 N |
| 4,694,066 | 9/1987 | DeMartino et al. | 528/373 |
| 4,707,303 | 11/1987 | Buckley et al. | 252/583 |
| 4,707,305 | 11/1987 | Choe et al. | 260/396 N |
| 4,766,171 | 8/1988 | DeMartino | 524/722 |

FOREIGN PATENT DOCUMENTS 60-152509  8/1985  Japan.

*Primary Examiner*—Allan M. Lieberman
*Attorney, Agent, or Firm*—Welsh & Katz, Ltd.

[57] ABSTRACT

A high performance nonlinear optical substrate comprising covalently linked chromophores within a glass film forming polymer, forms a single component polymeric frequency doubling material having a highly non-centrosymmetric architecture.

5 Claims, 2 Drawing Sheets

FIG-3-
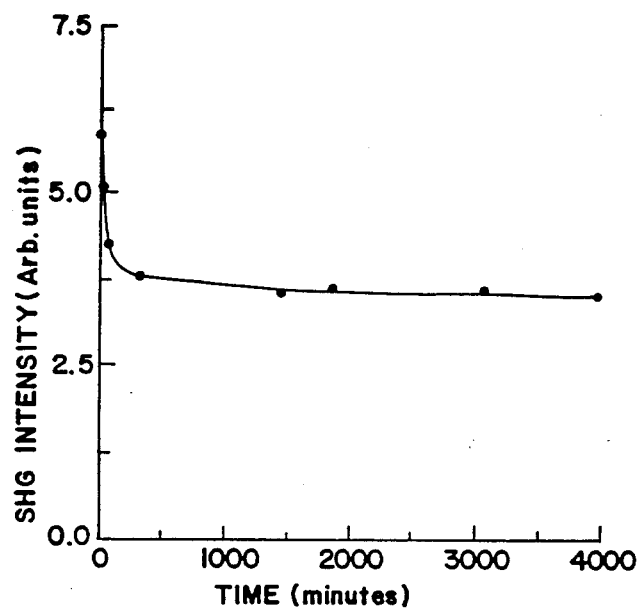
FIG-4-
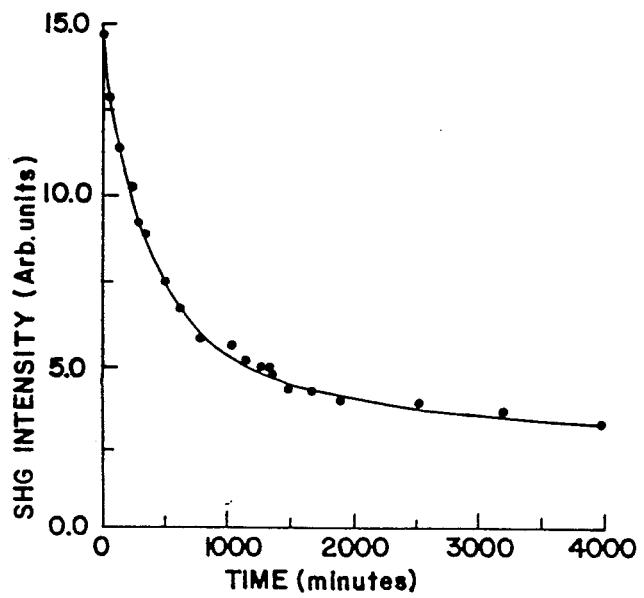

FUNCTIONALIZED POLYMERS FOR NONLINEAR OPTICAL APPLICATION

This invention was made with Government support under grant AFOSR-86-0105 awarded by the Air Force. The Government has certain rights in this invention.

BACKGROUND OF THE INVENTION

This application relates to materials with optical properties, and more specifically to single component polymeric frequency-doubling materials.

Materials which exhibit highly nonlinear optical characteristics of doubling or tripling the frequency of incident light are currently of great scientific and technological interest for use in optical telecommunications, optical signal processing and, ultimately, the construction of optical computers. Nonlinear optics is concerned with the interactions of electromagnetic fields in various media to produce new fields which may be altered in phase, frequency, or amplitude. Such media and their properties (their stability, ease of preparation, compatibility with microelectronic processing methods, adhesion, mechanical, and other properties) as well as their nonlinear optical properties will ultimately determine the technological utility of any possible application.

The use of inorganic materials, such as $KH_2PO_4$, $LiNbO_3$, or $InSb$, as NLO materials is being replaced by materials based upon conjugated $\pi$-electron organic chromophores, substances which normally supply color to a substance; such organic chromophores promise superior performance and adaptability to the desired chemical functions. Organic ($\pi$-electron) nonlinear optical materials characteristically have large non-resonant susceptibilities, ultrafast response times, low dielectric constants, high-damage thresholds and intrinsic tailorability. The nonlinear optical response exhibited by organic materials with such large delocalized $\pi$-electron systems is in many cases, much better than that shown by inorganic materials.

When utilizing nonlinear chromophores within an organic matrix to attain second order nonlinearities (frequency doubling, second harmonic generation or, simply, SHG), the chromophore molecules must be in a specifically aligned orientation within the organic matrix for the frequency doubling effects. Some current organic chromophore systems involve dissolving the chromophore guest molecules in a suitable polymer host, heating the mixture above the glass transition temperature of a polymer ($T_g$); the chromophore molecules are then orientated or "poled" by the use of an applied DC electric field and cooled. These materials are sometimes referred to as solid organic guest-host substrates. Several disadvantages with guest-host substrates have been noted. For example, there may be limited solubility of the chromophore in the host polymer, resulting in crystallization of the chromophore out of the polymer matrix and subsequent poor frequency coubling performance; instability of the polymer-chromophore mixture has been observed resulting in the leaching or vaporizing of the chromophore molecules from the host polymer, causing deterioration in frequency doubling performance; there may be mobility of the chromophore molecule within the host polymer matrix, allowing relaxation of the chromophore orientation and resulting in loss of second harmonic generation.

SUMMARY OF THE INVENTION

Accordingly, an object of the subject invention is a stable, long lasting, efficient, high performance nonlinear optical material.

Another object of the subject invention is the incorporation of a far higher amount of chromophore into a polymer matrix, causing higher frequency doubling performance.

Another object of the invention is the reduction of leaching and vaporization of chromophore materials from the polymer matrix, thereby providing a longer performance life.

A further object of the invention is the retardation of the relaxation of the preferential orientation of the chromophore molecule, thereby providing a longer performance life.

A further object is the provision of tailorability of performance characteristics for a certain environment and use through the selection of a specific chromophore molecule for a specific polymer matrix.

These and other objects are attained in the subject injection by covalently binding chromophore molecules to a polymer matrix. Nonlinear chromophores having large quadratic hyperpolarizabilities and covalently bonded to such a polymer matrix yield, after annealing and alignment in a DC electric field and cooling, a single-component polymeric frequency doubling material having a highly non-centrosymmetric architecture.

Other objects and advantages of the subject invention will become apparent from the accompanying drawings, descriptions, and examples wherein:

FIG. 3 is a graph showing the time dependence of the normalized second harmonic signal from a (PS)CH$_2$-RPy film poled at 0.40 Mv cm$^{-1}$.

FIG. 4 is a graph showing the time dependence of the normalized second harmonic signal from a (PS)O-NPP film poled at 0.80 Mv cm$^{-1}$.

DETAILED DESCRIPTION OF THE INVENTION

Materials and Methods

Figure 1:
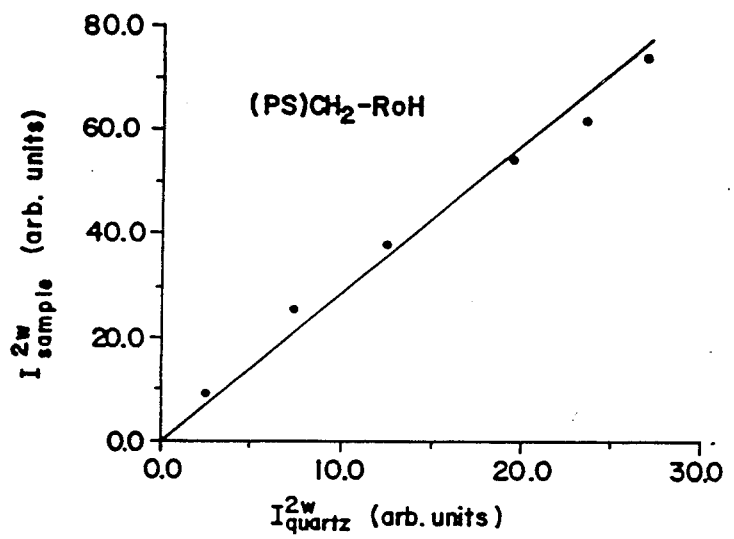
FIG. 1 is a graph showing second harmonic (532 nm) beams intensity emitted from a (PC)CH$_2$-ROHI film versus that from a quartz reference crystal.

In general, nitroaniline and related chromophores are useful for introduction into the polymer matrix for forming an NLO material; in principal, a noncentrosymmetric chomophore with delocalized conjugated $\pi$-electrons, and the chromophore molecule having an asymmetric charge distribution with a high $\beta$ exhibit highly nonlinear optical effects. The polarization P induced in a molecule by a local electric field E may be measured:

$$P = \alpha E^1 + \beta E^2 + \gamma E^3 + \ldots$$

Specific chromophores which may be useful are the following:

Alcohol Chromophores:

3
-continued
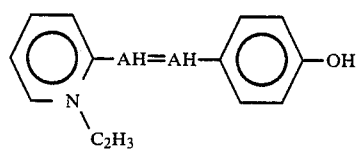
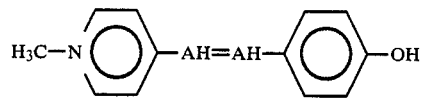
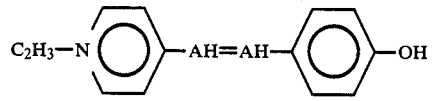
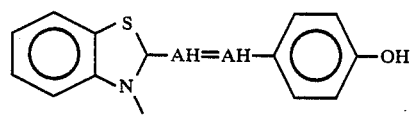
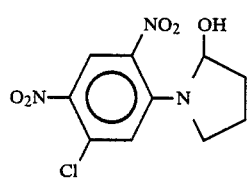
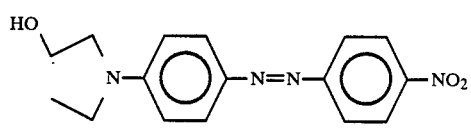
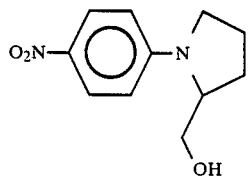
and
Pyridinium Chromophores:
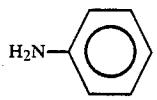
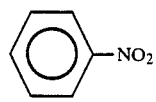
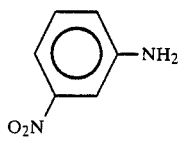
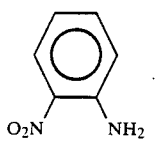
4
-continued
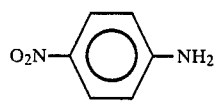
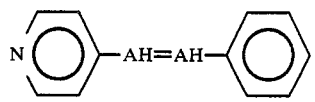
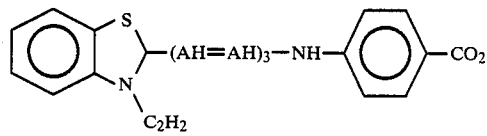
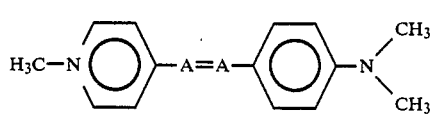
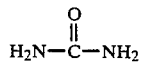
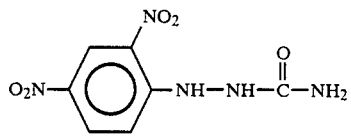
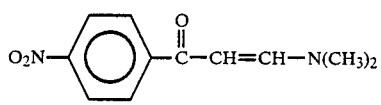
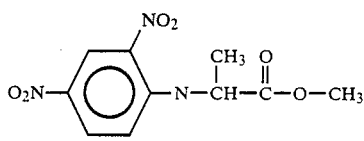
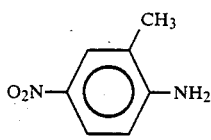
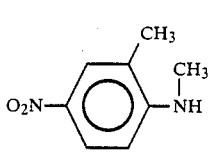
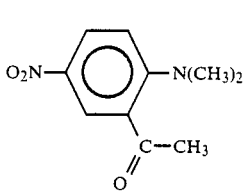

-continued

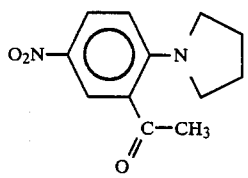

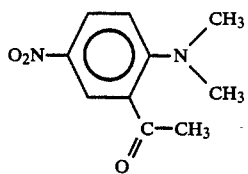

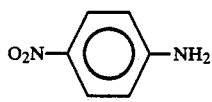

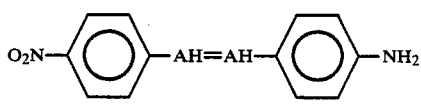

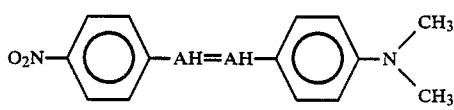

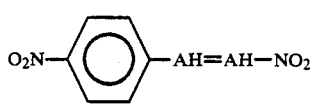

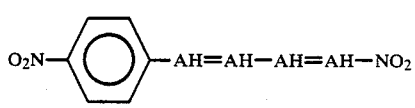

Where A = C or N

In general, a polymer should be chosen for use as the matrix which has, primarily, a reactive group for attachment of the chromophore. Equally important is that the polymer must have excellent transparency, good film-forming characteristics, a low dielectric constant (a property shared by most polymers), and a relatively high glass transition temperature $T_g$ (to help stabilize poling-induced chromophore orientation). Other considerations may come into play when the specific environment and the specific end use of the nonlinear optical (NLO) material are taken into account.

Polystyrene, by the above standards, is an excellent choice for the polymer matrix; other possible polymers are polycarbonate, polymethylmethacrylate, polyvinylalcohol, polyvinylchloride, polyvinylpyridinium, and polyvinylacetate.

When polystyrene is used for the matrix, it is first chloromethylated, and then converted to the more reactive iodomethyl derivatives as set forth in Equation I:

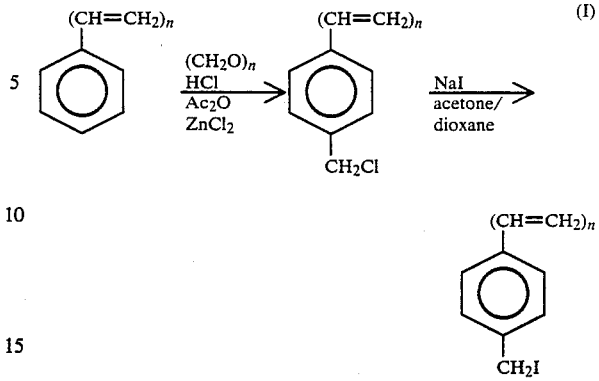

Introduction of high $\beta$-chromophores (I) such as alcohol chromophores or pyridinium chromophores into the polystyrene may be effected by thallium-mediated etherification (II) or by quaternization (III):

Alcohol Chromophores - (ROH)  (II)

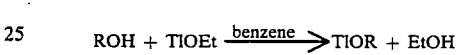

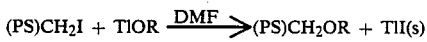

Pyridinium Chromophores - (py)  (III)

Poly(p-hydroxystyrene) may also be functionalized to form an NLO material. A suitable chromophore is converted to a tosylate, which is then subjected to nucleophilic substitution by (PS)O⁻. Stronger ties of the poled NLO material within the polymer matrix results from the existence of hydrogen bonding.

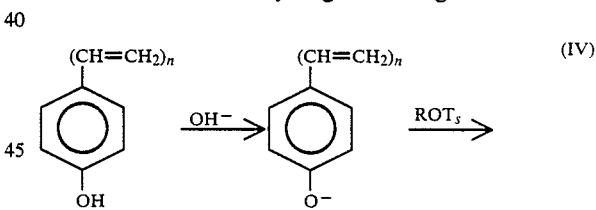

ROH = an alcohol chromophore

The functionalization process is monitored by 400-MHz ¹H NMR spectroscopy; and the new polymers are characterized by standard spectroscopic/analytical techniques and by DSC.

Films of the chromophore-functionalized polymers are formed by spin coating onto indium tin oxide (ITO) coated conductive glass in a class-100 cfm laminar-flow clean hood with the functionalized polymers after they have been multiply suction-filtered through a 5 μm frit. The resulting film, between 0.3 and 7.0 μm thick, is vacuum dried and covered by a second electrode; this second electrode may be ITO coated, aluminum foil, gold foil, a metallic vapor-deposited film or the like. The polymer film is then raised to near its glass-rubber transition temperature ($T_g$). In the rubbery state, large scale molecular motion is enhanced and the individual chromophore molecules are permitted to rotate.

It has been found that, to a large degree, failure of the NLO material, because of shorts, arc-overs and the like may be ameliorated by repetitive annealing prior to poling. In other words, the NLO material is heated to near $T_g$, and cooled to approximately room temperature. This process is repeated several times prior to poling. It is believed that this additional step has the advantage of eliminating or reducing the number of pinholes, voids, free volumes, and other anomalies in the NLO material which causes the shorts during poling or rapid relaxation thereafter. Annealing in this manner appears to remove residual stress in the NLO film as well as remove undesirable anisotropics while permitting poling at a higher field strength such as 0.2 Mv to 1.0 Mv. It has been observed that higher field strengths in this range result in a stronger, more permanent retention of the chromophore in the desired orientation within the polymer matrix.

At temperatures near $T_g$, an intense electric field (0.2–1.0 Megavolts/cm ($Mv\ cm^{-1}$)) is applied to the NLO film for about 20 minutes. The film is then cooled to well below $T_g$ in the presence of the electric field. Without the annealing step, such an intense electric field would not generally be possible. Finally, the electric field is removed, resulting in a system where the NLO components are fixedly aligned in a preferred orientation and covalently linked with the polymer matrix.

Further stabilization of the chromophore alignment can be achieved by radiation-induced cross-linking of the matrix. This can be carried out using an electron, x-ray, or gamma-ray beam directed at the film.

In the following examples, all parts and percentages are by weight unless expressly indicated to be otherwise.

EXAMPLE I

Polystyrene having a molecular weight of approximately 22,000 is chloromethylated by combining 10 parts polystyrene with 6 parts paraformaldehyde, 10 parts HCL gas, 7 parts acetic anhydride, and 1 part zinc chloride catalyst in a 1,2 dichloroethane solvent (60 parts). 11 parts of the resulting chloromethylated polystyrene are then mixed with 17 parts of sodium iodide in a 3–4% acetone/dioxane (3:1) solution result in an iodomethylpolystyrene $(PS)CH_2I$.

EXAMPLE II

To insert an alcohol chromophore into the iodomethylated polystyrene matrix $(PS)CH_2I$ of Example I, the alcohol chromophore, 4-(4-nitrophenylaza)(N-(ethyl)(2-hydroxyethyl)aniline (disperse Red I) is effected by thallium-mediated etherification, i.e., 1 parts of the alcohol chromophore is added to 2.8 parts of thallium ethoxide in a benzene solution, resulting in a thallium chromophore ether and ethyl alcohol. 8.8 parts of the iodomethylated polystyrene is added to the above thallium chromophore ether in 400 parts of dimethylformamide solvent to result in the alcohol chromophore functionalized polystyrene, (hereinafter, $PSCH_2$-ROH). $PSCH_2$-ROH, 12.5% functionalized in dioxane, is multiply suction-filtered through a 0.5 μm frit and then spin coated onto pieces of ITO-coated conductive glass in a class 100 laminar flow clean hood (to minimize contamination by dust) to form a 0.5–2.0 μm thick film. After being dried under vacuum, the film is then annealed by raising it to 100° C. and cooling to room temperature several times.

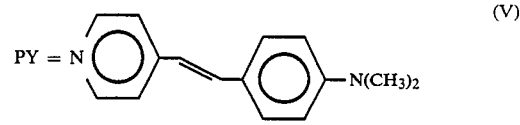

(V)

The annealed NLO film is covered with a second ITO electrode and is then poled in an electric field (0.2 Mv $cm^{-1}$) for 20 minutes at 115° C., and subsequently cooled while still in the electric field.

EXAMPLE III

A pyridinium chromophore is covalently linked to the polystyrene matrix of iodomethylated polystyrene formed as in Example I above; 10 parts $PSCH_2$-I is added to 3 parts chromophore to make 1–4% 4-(4-N,N-dimethylamino-styrol)pyridine (II), methyl alcohol solution and results in a pyridinium chromophore substituted polymer. A 1–4 μm film is prepared and poled as in Example II. Chromophore functionalization levels are at about 5–10% of the phenyl rings. The new compound is characterized by UV visible and 400 MHz $^1H$ NMR spectroscopy, as well as by elemental analysis. The thermal characteristics of the polymer is assessed by DSC. A film is fabricated and poled, as in Example II. The film thickness measures, after poling, typically 1.0 to 4.0 μm. Cross-linking of the poled film is carried out by irradiating with 10–30 hv electron beam to a dose of $10^{-6}$–$10^{-4}$ $C/cm^2$.

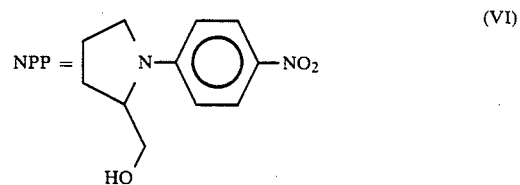

(VI)

EXAMPLE IV

The chromophore N-(4-nitrophenyl)-L-prolinol (NPP) is covalently linked to the polystyrene matrix of poly(p-hydroxy-styrene) by first converting the chromophore to the corresponding tosylate by standard procedure (Marvel and Sekera, Org. Synth. III 366 1 (1955)) then subjecting the tosylate to nucleophilic substitution by $(PS)O^-$ by stirring in dimethylformamide. The chromophore substituted polymer ((PS)ONPP) results. Chromophore functionalization levels are at about 50%–60% of the phenyl rings. The new compound is characterized by UV visible and 400 $MH_2$.

Figure 2:
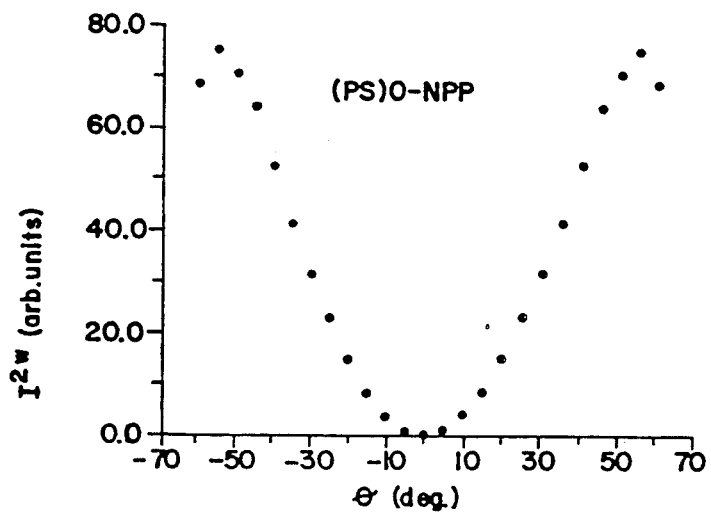
FIG. 2 is a graph showing second harmonic intensity for a typical (PS)O-NPP film as a function of a incident angle of the 1064 nm beam.

Second harmonic coefficients of the poled-functionalized polymer films were measured with 1064 nm incident radiation. Both the monochromatic nature of the emitted light (532 nm), the quadratic dependence of its intensity on the intensity of the incident beam (FIG. 1), and the dependence of its intensity on the incident angle of the fundamental beam (FIG. 2) incidates second harmonic generation by a film of preferentially oriented chromophores. The angular dependence of the data can be analyzed via standard formalism to yield the second harmonic coefficient approximate for a uniaxial material, $d_{33}$.

The exact magnitude of $d_{33}$ was found to depend on a number of parameters, such as the identity of the NLO chromophore, the level of incorporation, and the poling conditions. Table I provides an indication of the very large SHG effects that can be achieved with the functionalized polymers. Particularly striking is the large $d_{33}$ value for (PS)O-NPP. The comparable parameter for potassium acid phosphate ($d_{36}$) is $1.1 \times 10^{-9}$ esu.

TABLE I

Second Harmonic Coefficient For Chromophore Functionalized Polystyrene

| Material | Functionalized Level (% Phenyl Rings) | Poling Field (Mv/cm) | $d_{33}$ ($10^{-9}$ esu) |
|---|---|---|---|
| (PS)CH$_2$—ROH | 12.5 | 0.30 | 2.7 |
| (PS)CH$_2$—RPy | 4.5 | 0.30 | 0.12 |
| (PS)O—NPP | 60.0 | 0.80 | 11 |

The temporal stability of the SHG characteristics after poling is of great technological importance. All of the materials examined evidenced some decay of SHG efficiency with time. This is graphically shown in FIGS. 3 and 4. FIG. 3 represents the time dependence of the normalized second harmonic signal from a PSCH$_2$-II to film poled at 0.40 mv cm$^{-1}$. FIG. 4 represents the time dependence of the normalized second harmonic signal from a PSO-NPP film poled at 0.80 mv cm$^{-1}$. The decay is far less substantial and less rapid than for polystyrene films which are simply doped with comparable NLO chromophores and poled under identical conditions and even less when annealed. In fact, such doped polystyrene films have a shelf life which is normally counted in hours, possibly days, whereas the shelf life of the covalently-linked chromophore/polystyrene materials of the subject invention may be measured in months or years, giving a substantial increase in the shelf life of such materials. The reason for such significantly longer shelf life reflects the highly constrained chromophore mobility in the covalently linked systems resulting from annealings, poling at higher field strengths, and radiation cross-linking. That the present decay curves cannot be fit to a single exponential argues that several relaxation processes are involved in the chromophore realignment. We find that for comparable poling conditions, the SHG signals of (PS)CH$_2$-RPy films ultimately decay to about 50% of the original value, which is about 30% from (PS)O-NPP films. Among other factors, these differences can be attributed to the ionic character in higher $T_g$ of (PC)CH$_2$-RPy which implies more effective freezing of the chromophore orientation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. A shaped article with a thin cross-section comprising a polymer composite having second order nonlinear optical properties and wherein the chromophore alignment within the polymer matrix enhances frequency doubling, said polymer composite being transparent, of low crystalline content, with a high glass transition temperature, and comprising the covalently linked structure of (PGR)$_n$;

wherein P is a monomer of the basic polymer matrix, said monomer selected from the group consisting of polystyrene, polymethylmethacrylate, polyvinylalcohol, polyvinylchloride, polyvinylpyridine and polyvinylacetate;

G is a reactive binding; and

R is an organic non-centrosymmetric chromophore with delocalized conjugated $\pi$-electrons and a high $\beta$.

2. The polymer of claim 1, wherein R is selected from the group consisting of alcohol chromophores and pyridinium chromophores.

3. The polymer of claim 1, wherein R is selected from the group consisting of:

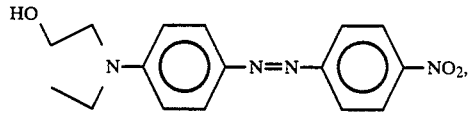

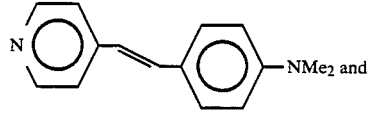

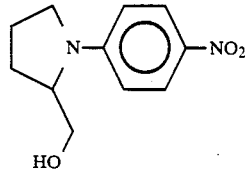

4. A thin film having a thickness of between 0.3 and 7.0 micrometers, comprising a polymer composite having second harmonic generation, nonlinear optical properties and wherein the chromophore alignment within the polymer matrix enhances frequency doubling, comprising a structure selected from the group consisting of:

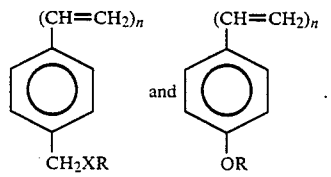

where n > 10, X is selected from the group consisting of chlorine and iodine, and R is an organic chromophore selected from the group consisting of:

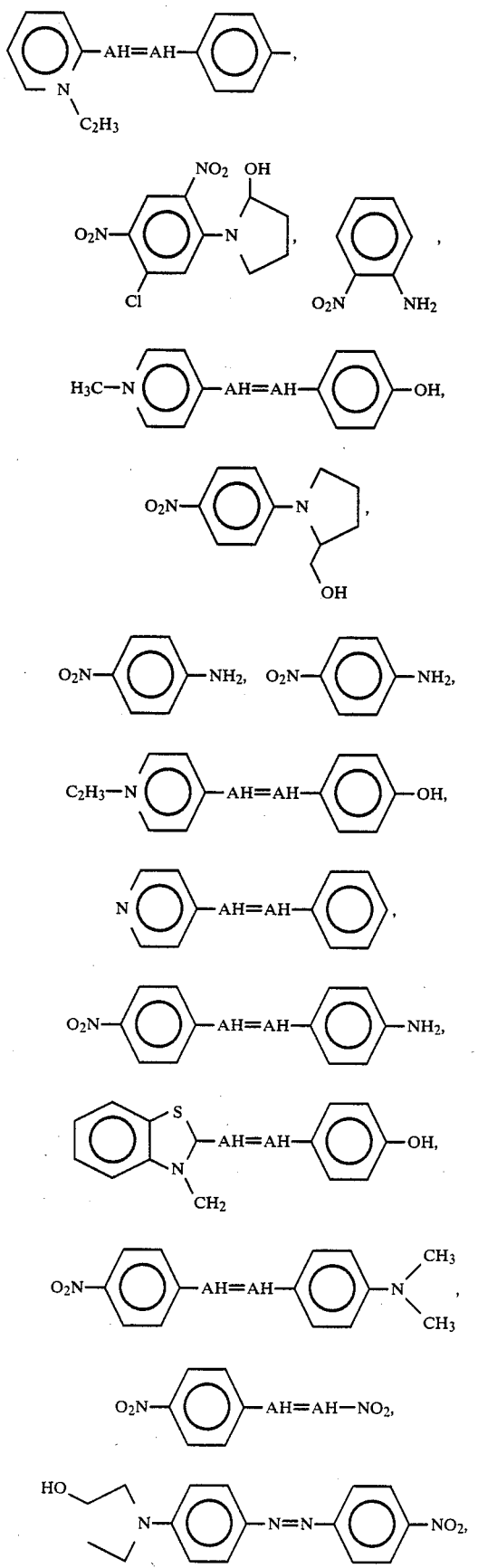
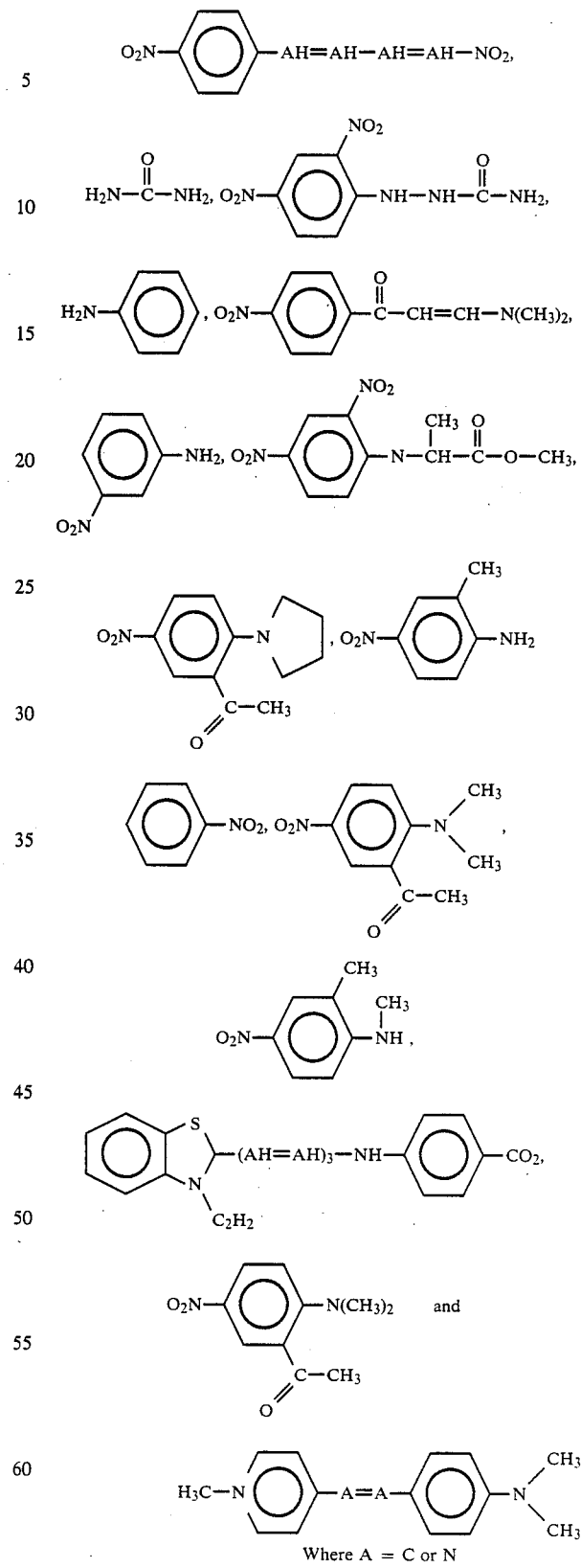
5. The polymer of claim 4, wherein said chromophore is noncentrosymmetric, with delocalized conjugated electrons and a high $\beta$.
* * * * *